A. T. VAN ALSTYN.

CATAMENIAL BANDAGE.

APPLICATION FILED DEC. 6, 1916.

Reissued Sept. 9, 1919.

14,722.

Inventor

Albert T. Van Alstyn

By Benj. R. Newcomb

Attorney

THE COLUMBIA PLANOGRAPH CO., WASHINGTON, D. C.

REISSUED

UNITED STATES PATENT OFFICE.

ALBERT T. VAN ALSTYN, OF GRAND RAPIDS, MICHIGAN.

CATAMENIAL BANDAGE.

14,722. Specification of Reissued Letters Patent. Reissued Sept. 9, 1919.

Original No. 1,175,090, dated March 14, 1916, Serial No. 859,939, filed September 3, 1914. Application for reissue filed December 6, 1916. Serial No. 135,483.

*To all whom it may concern:*

Be it known that I, ALBERT T. VAN ALSTYN, a citizen of the United States, residing in Grand Rapids, in the county of Kent and State of Michigan, have invented certain new and useful Improvements in Catamenial Bandages, of which the following is a specification.

My present invention relates to an improvement in catamenial bandages or napkins and has for its object among others, the provision of an economical duplex bandage, one that is sanitary, easily laundried, and readily adjustable to suit different anatomical requirements.

Another advantage of my device is that it contains no unsanitary pockets or crevices in which excreta may lodge and therefore be difficult of cleansing.

Other advantages of my device are that it is reversible and owing to its substantially duplex or symmetrical form may be folded for use entirely according to the caprice, comfort or physical requirements of the wearer.

Another object resides in providing a bandage which comprehends a plurality of identical parts forming a unit and any one of said parts may be folded to form a relatively small but thick pad, the remainder of the article serving as an exterior wrapper for the pad and providing attaching ends.

Figure 2:
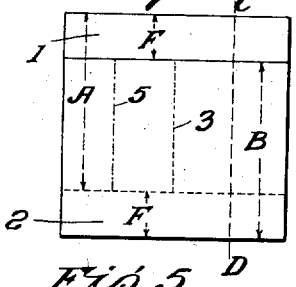
Fig. 2 is a view showing the bandage opened out flat.
Figure 2A:
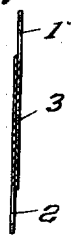

Fig. 2ª is an end elevation of the bandage as opened out.

Figure 3:
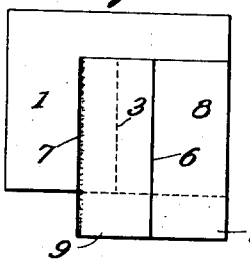

Fig. 3 is a view similar to Fig. 2 showing one fold made in the bandage.

Figure 4:
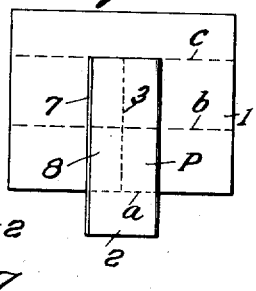

Fig. 4 is a view similar to Fig. 3 showing a second fold.

Figure 5:
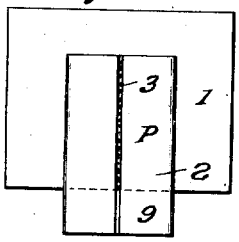

Fig. 5 is a view similar to Fig. 4 showing a different type of fold.

Figure 6:
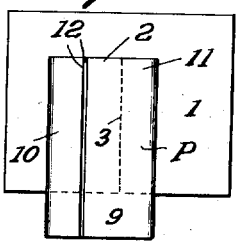

Fig. 6 is a view similar to Fig. 4 showing another fold therein.

Figure 7:
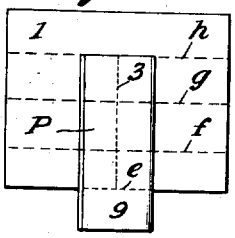

Fig. 7 is a view showing indications of other methods of longitudinal folding.

In my present improvement, my duplex bandage is shown as being substantially square or rectangular as in Fig. 2 and comprises a pair of fabric members, 1 and 2 and which members are arranged together and held in operable form by a line of stitching 3 which partially traverses the transverse center of the two bandages.

By referring to any of the figures, it will be noted that the bandages 1 and 2 are preferably longer than their width as indicated at A and B but that they are so overlapped or off-set, as in Fig. 2ª that they present a substantially square area, as shown in Fig. 2.

The distance F, F, that the bandages are offset from one another before stitching depends entirely upon the length of the fabric from which the bandage is made relatively to its width.

It is not necessary that the sewing 3 be done near the central position but it may be located to one side thereof as indicated by the dot and dash line 5 in Fig. 2. Also, a plurality of lines of stitching might be employed but this last noted method of affixing the bandages to one another would form unsanitary pockets between the lines of stitches and would therefore make the bandage undesirable, owing to such pockets being difficult to clean by means of the usual laundrying.

In Fig. 3, there is shown the first step in folding the bandage for use, wherein the first lap 6 has been folded over along the edge 7, the entire length of the member 2 being diminished approximately one-third. The unfolded portion 8 of the member 2 is then folded over until its edges abut the folded edge 7 of the lap 6 thereby forming substantially a three-ply thickness of fabric approximately centrally located, longitudinally, on the member 1, as indicated in Fig. 4. This three-ply thickness, of course, applies only to the overhanging end 9 of the folded member 2 inasmuch as where the said folded member 2 is attached by sewing to the member 1, the thickness of the material is four-ply owing to the addition of the fabric 1.

Figure 1:
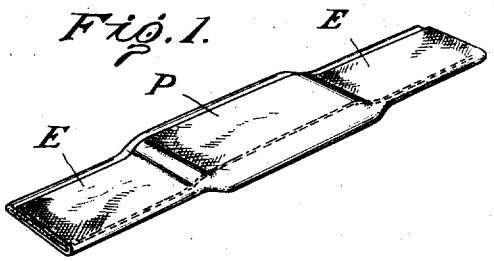
Figure 1 is a perspective view of the bandage, showing the same folded ready for use.

In Fig. 4 there are shown three transverse dotted lines *a*, *b*, *c* which lines are for the purpose of indicating the folding points of the four laps which form the bandage for use, as indicated in Fig. 1. First the end 9 is folded over on the dotted line *a* and then the members 1 and 2 are folded together on the second dotted line *b* and then the article is again folded on the dotted line *c* for thereby forming an interior absorbent portion P of twelve thicknesses or plies of fabric at the middle or absorbent portion thereof and leaving only a thickness of three-plies or laps of the material 1 at the suspending ends E, Fig. 1, which ends therefore have less fabric than the middle or absorbent portion thereof. An advantage is gained in this regard, inasmuch as the ends E are customarily the points of attachment for suspending or securing the bandage during use and owing to the minimum amount of fabric left on said ends, they do not form bulky or unsightly protrusions thereby causing embarrassment to the wearer, while at the same time the maximum portion is so arranged in the interior of the bandage in such a manner as to bring the greater volume of fabric where it is most useful.

In Fig. 5 there is disclosed another form of folding wherein the member 2 is lapped so that its outer lateral edges meet at the center near the point of attachment and from this point on, further longitudinal folding forms a complete bandage like that described for Fig. 4.

In Figs. 3, 4, 5 and 7, the middle absorbent member 2 has been shown as being so located that when folded, the points of attachment E are approximately the same in length. In Fig. 6, however, there is shown another method of folding wherein one lap 10 is extremely short and the other lap 11 is greater, so that the edges 12 of the two folds meet at one side or the other of the point of stitching 3. The longitudinal folding of the napkin then ensues as described in connection with Fig. 4 and the bandage formed by this last noted arrangement of fabric causes one of the ends E to be of greater length than its opposite member thereby transferring or displacing the bulk of the absorbent portion to one end or the other of the folded napkin, as desired.

In Fig. 7 there is shown a bandage folded to a point similar to that described in connection with Fig. 4, and there are indicated four longitudinal dotted lines, *e*, *f*, *g*, *h*, which lines indicate the folding edges of five different laps thereby making the bandage of a greater number of thicknesses of material although it would not be so wide a bandage as that made possible by the arrangement illustrated in Fig. 4.

A careful study of the foregoing will make it obvious that my device comprises two members, one of which forms substantially an inner absorbent member, and the other member an outer envelop and securing means for the inner member.

It is also obvious that the members forming the bandage, before folding, may be rectangular pieces of fabric stitched in a certain relative position to one another by one or more rows of stitching and thereafter the bandage proper is formed by a plurality of longitudinal and transverse foldings.

Owing to the fact that my bandage is comprised of practically two like members either of which may be folded in the manner that member 1 is folded while the other is folded in the manner of member 2, my modification therefore becomes a reversible contrivance, in which case either member may be used as the interiorly contained absorbent member while the other forms the envelop or suspending means. This particular feature has great utility inasmuch as many of these napkins when in use are pinned to supporting belts or like means, and this constant pinning will naturally tend to fray out the ends E. Therefore, the reversibility of the napkin permits this abnormal wear to be distributed over both members as they are, from time to time, alternately used as an enveloping or supporting member.

It is obvious that my invention is capable of utilization in bandages of other forms than that described above, hence I desire the various figures of the drawing and the foregoing description to be understood as illustrative only and not as limiting the scope of my invention.

I claim:

1. A duplex napkin formed of a pair of symmetrically arranged pieces of fabric, partially lapped with one another and stitching through the center of the lapped portion thereof, either of said pieces adapted to form the inner absorbent portion and the other of said pieces forming the envelop therefor.

2. A duplex reversible napkin formed of a pair of symmetrically arranged pieces of fabric, partially lapped with one another and stitching through the center of the lapped portion thereof, either of said symmetrical members being adapted, after being folded, to form the inner absorbent member or the outer envelop therefor.

3. A duplex napkin comprising two pieces of absorbent fabric offset from one another and being connected together intermediate of the offset portion, either of said pieces adapted to form the inner absorbent portion and the other of said pieces forming the envelop therefor.

4. A napkin composed of a pair of like pieces of fabric, one partially lapped over the other, stitching through the center of the lapped portions to secure the two pieces of fabric together, one of said pieces being folded over both lengthwise and sidewise into a short and narrow package to form the absorbent member, and the other of said pieces being folded over only sidewise to inclose said absorbent member, while the ends of said enveloping piece form the attaching means by which the bandage may be secured to the garment of the wearer.

5. A bandage comprising two connected members, either of which may be folded transversely upon itself and then folded longitudinally a plurality of times thereby forming a relatively short but thick absorbent pad, said pad being folded within the other member whereby the folded bandage comprises the pad inclosed in an outer container formed of the remaining member and providing relatively thin attaching ends, said container being capable of being unfolded to permit the entire bandage to be fully spread open for laundrying purposes.

In testimony whereof I have hereunto set my hand in the presence of two subscribing witnesses.

ALBERT T. VAN ALSTYN.

Witnesses:
GEORGE W. GRAVES,
DANIEL D. SANGUINELLI.

Copies of this patent may be obtained for five cents each, by addressing the "Commissioner of Patents, Washington, D. C."